Nov. 14, 1961 R. R. HOLLIEN 3,008,499
MITER BOX CONSTRUCTION
Filed Aug. 12, 1959
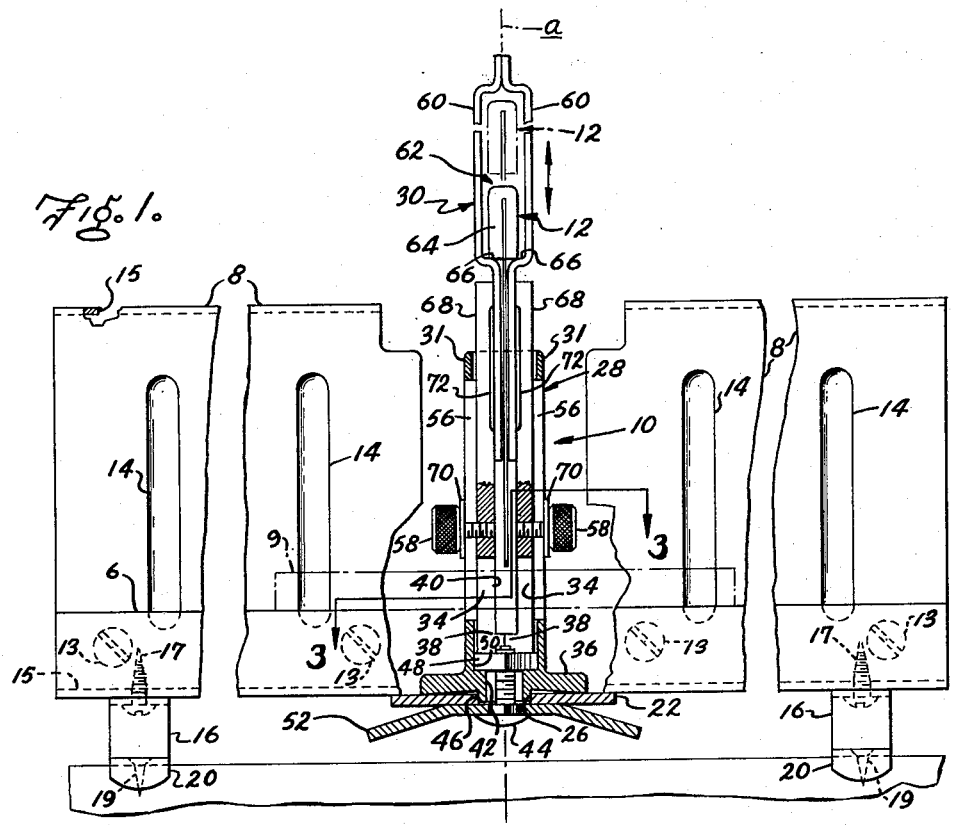
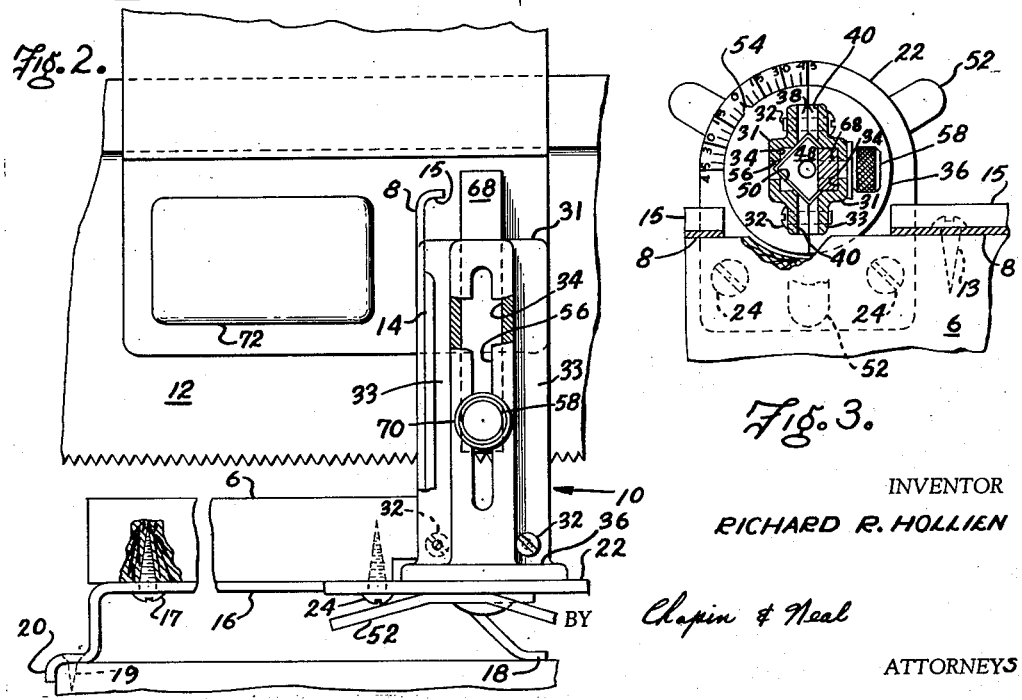
INVENTOR
RICHARD R. HOLLIEN
BY Chapin & Neal
ATTORNEYS

United States Patent Office 3,008,499
Patented Nov. 14, 1961

3,008,499
MITER BOX CONSTRUCTION
Richard R. Hollien, Shelburne Falls, Mass., assignor to Millers Falls Company, Greenfield, Mass., a corporation of Massachusetts
Filed Aug. 12, 1959, Ser. No. 833,233
7 Claims. (Cl. 143—89)

This invention relates to miter box construction and more particularly to miter boxes of the type having a single upstanding saw support means.

The object of this invention is to provide a miter box having improved constructional characteristics at relatively low cost.

This invention is characterized by saw support means for a miter box which is of symmetrical configuration about the plane of the saw blade, and comprises a saw guide of relatively flexible sheet metal construction, an upstanding saw guide support post, and relatively rigid guide keys disposed on the guide plates and engaged with the post increasing the structural rigidity of both the saw guide and post and rigidly holding opposed plate portions of said saw guide in predetermined spaced relation.

The above and other objects and advantages of this invention will be apparent from the following description, and with reference to the accompanying drawing in which:

FIG. 1 is a front elevation with parts cut away of a miter box embodying the invention;

FIG. 2 is a side elevation of the miter box which is shown in FIG. 1; and

FIG. 3 is a section taken along the line 3—3 of FIG. 1.

Referring in detail to the drawing, a miter box embodying this invention comprises a base or bottom board 6, a pair of back plates 8 for positioning a workpiece 9 on the upper surface of the board 6, and means indicated generally at 10 for supporting a back saw 12 in a desired angular and vertical relation with respect to the workpiece. The support means 10 is mounted for angular movement about a vertical axis $a$ enabling workpieces to be cut at various angles. The support means is also vertically adjustable for varying the depth of cut of the saw.

The back plates 8 are secured to the rear edge of the board 6 by means of screws 13. The inner vertical edges of the plates are spaced apart sufficiently to provide a slot for the saw blade which enables the saw to be moved through a horizontal angle of at least 90°. The plates 8 include vertically extending ribs 14 and flanges 15 which extend rearwardly from their upper and lower edges providing the plates with increased strength and rigidity.

The miter box is supported on an underlying surface, such as a table top or workbench, by means of a pair of metal bars 16 shaped to provide supporting legs. Each of the bars is secured to the undersurface of the board 6 adjacent the ends thereof by means of a pair of screws 17, only one of which is shown. Each bar is formed to provide a back and front leg. The back legs are inclined downwardly and outwardly of the undersurface of the board 6 and terminate in outwardly extending horizontal feet 18 (FIG. 2). The front legs include horizontally extending portions having openings therethrough to receive screws 19 for holding the instrument in a fixed position on a workbench. The front legs include downwardly extending portions 20 for engaging the edge of the bench on which the instrument is mounted.

The saw support means 10 is mounted on a horizontally disposed bracket or support plate 22 which is secured to the undersurface of the baseboard 6 by means of a pair of screws 24 (FIG. 3). The bracket 22 extends outwardly of the back edge of the board 6 and is disposed intermediate the spaced inner vertical edges of the back plates 8. The bracket 22 is provided with a centrally disposed opening 26 for receiving the lower portion of the support means 10.

The saw support means 10 includes an upstanding bifurcated post 28 pivotally mounted on the bracket 22 and a saw carrier or guide 30 carried by the post and slidable vertically therein. The post comprises two identical metal castings 31 held together by means of self-tapping screws 32 which are screwed into holes in opposed flange portions 33 (FIG. 2) of the castings adjacent their lower ends. The post includes opposed guide channels 34 which extend upwardly from a base portion 36 of the post. Each casting includes projections 38 which extend inwardly from opposite surface portions of the flanges 33 adjacent the base of the post providing upwardly opening slots 40 between the flanges, above the projections, for receiving the lower portion of the saw guide. The base portion of the post is provided with a centrally disposed opening 42 for receiving a carriage bolt 44 which extends upwardly through the opening 26 of the bracket 22. A hub 46 disposed around opening 42 extends downwardly from the undersurface of the base 36 into the opening 26 of the bracket. The hub fits within the opening 26 with a clearance which enables the post to be rotated freely on the bracket 22 without excessive wobbling. A nut 48 disposed within a rectangular chamber 50 (FIG. 3), formed in post 28 above the hole 42, receives the threaded inner end of the bolt 44. A three-armed locking lever 52 has an opening which receives the neck portion of the carriage bolt so that rotation of the lever rotates the bolt. The outer portions of the arms extend downwardly at an acute angle to the undersurface of the bracket 22 to facilitate manipulation of the lever. The nut 48 is prevented from rotating by the walls of the chamber 50. Rotation of the lever screws the bolt into or out of the nut 48 depending upon the direction of the rotation of the lever. When the nut is loosened, the post 28 is free to rotate about the vertical axis $a$, and when the nut is tightened down the post is locked in a selected angular position on the bracket 22. The undersurface of the base 36 is of slightly dished or concave configuration insuring firm surface-to-surface engagement of the outer edge portion of the base with the upper surface of the bracket 22. The base 36 is provided with an index projection 54 and the upper surface of the bracket 22 is marked with angular graduations. The index projection and graduations indicate the angular position of the saw 12 relative to a workpiece. The outer wall portions of the post guide channels include elongated vertically disposed slots 56 which permit vertical adjustment of the saw guide 30. Thumb screws 58 extend outwardly of the saw guide 30 through the slots 56 for locking saw guide 30 at selected vertical positions relative to the base 6.

The saw guide 30 comprises a pair of stamped metal plates 60 having flanged upper edge portions which are joined together by suitable means such as spot welding. The plates extend outwardly of the flanges, downwardly in spaced parallel relation, and inwardly defining a chamber or slot 62 for receiving the back strip 64 on the upper edge of the back saw 12. The slot 62 is of sufficient width to enable the saw to be moved readily within the saw guide. The inwardly extending portions of the plates provide shoulders 66 for supporting the saw in the saw guide. From the shoulders 66 the plates 60 extend downwardly into the upwardly opening slots 40 of the post, between the guide channels 34. The lower portions of the plates, below the shoulders 66, provide means for guiding the saw blade. The saw guide is sufficiently flexible to enable its lower portions to be deflected or flexed outwardly of each other. Guide keys or bars 68 of relatively rigid construction are secured to opposing outer surface portions of the guide plates and extend below the lower edges thereof. The bars 68 have a thickness approximately equal to the depth of the guide channels 34 and are of a length approximately equal to the length of the channels. A tapped hole is provided adjacent the lower edge of each bar to receive the thumb screws 58, which are provided with washers 70.

When the thumb screws 58 are loosened, the keys and saw guide are readily movable vertically in the guide channels of the post. The flexibility of the saw guide is sufficient so that when the thumb screws 58 are screwed into the guide keys, the keys are pulled outwardly against the outer wall portions of the guide channels. The dimensional relationship of the width of slots 40 and depth of channels 34 to the thickness of the guide plates and keys is such that when the keys are pulled outwardly against the outer wall portions of the guide channels the outer surface portions of the plates 60, adjacent the keys, are drawn into firm surface-to-surface contact with flanges 33 of the post. This insures uniform spacing between the lower portions of the plates 60 throughout the life of the instrument even thought the saw guide is made of relatively inexpensive metal stampings. This uniform spacing enables the blade of the saw to be reciprocated between the plates without binding or excessive friction. The plates 60 are recessed as at 72 to further increase their rigidity and reduce the possibility of frictional drag on the saw blade.

As can be readily seen in FIG. 1, the post 28 and saw guide 30 are of symmetrical configuration about the plane of motion of the saw blade. With the thumb screws 58 turned down, as described above, the guide keys are held in generally parallel relation by the guide channels of the post. Forces transmitted by the saw to the saw guide are distributed equally to both keys, and consequently to the supporting post 28. Since the relatively rigid guide keys are secured directly onto the plates 60, they function as rigid backing members for the plates 60 providing a relatively rigid saw guide, even though the guide itself is made of relatively flexible inexpensive sheet metal stampings. The symmetrical construction of the post and saw guide, and the rigidity imparted to the plates 60 by the keys, substantially eliminate any tendency of the saw blade to bind when it is being used.

In addition to providing the proper spacing between the lower portions of the guide plates, the engagement of both the guide keys and the plates 60 with the post insures firm locking of the saw guide in selected vertical positions. Furthermore, the engagement of the relatively rigid guide keys in the guide channels increases the structural rigidity of the post 28.

Having thus described this invention, what is claimed is:

1. A miter box comprising a baseboard, an upstanding post member pivotally supported by the baseboard, means for releasably locking said post in a given angular position, said post member comprising spaced opposed upwardly extending guide channels having elongated upstanding slots through opposite wall portions thereof, a sheet metal saw guide having an upper portion shaped to receive the upper edge of a back saw and depending plates disposed between the guide channels of said post member for guiding the reciprocating motion of the saw blade in a given plane, a pair of relatively rigid guide bars secured to opposite outer surface portions of said depending plates and slidingly disposed in said guide channels, and means extending from said guide bars outwardly through said elongated slots for bringing said bars into engagement with the wall portions of said guide channels to releasably lock said saw guide in selected vertical relation to said baseboard, said saw guide being sufficiently flexible to enable said depending plates to be deflected outwardly of each other when said guide bars are brought into surface-to-surface engagement with outer wall portions of said guide channels, said saw guide and post being dimensioned to provide a predetermined spaced relation between said depending plates when the saw guide is so locked in a given vertical position whereby the depending plates are rigidly held in said predetermined spaced relation.

2. A miter box comprising a baseboard, a support bracket secured to the baseboard, an upstanding post member pivotally mounted on said bracket, means for releasably locking said post in a given angular position on said bracket, said post member comprising spaced opposed upwardly extending guide channels having elongated upstanding slots through opposite wall portions thereof, a sheet metal saw guide having an upper portion shaped to receive the upper edge of a back saw and depending plates disposed between the guide channels of said post member for guiding the reciprocating motion of the saw blade in a given plane, a pair of relatively rigid guide bars secured to opposite outer surface portions of said depending plates and extending below the lower edges thereof, said guide bars having a length approximately equal to said guide channels and being slidingly disposed therein and screws extending from said guide bars through said elongated slots for releasably locking said saw guide in selected vertical relation to said baseboard, said saw guide being sufficiently flexible to enable said depending plates to be deflected outwardly of each other when said screws are turned to lock the saw guide in a given vertical position enabling said guide bars to be brought into firm surface-to-surface engagement with outer wall portions of said guide channels, said saw guide and post being dimensioned to provide a predetermined spaced relation between said depending plates when the saw guide is so locked in a given vertical position whereby the guide bars rigidly hold said depending plates in said predetermined spaced relation, said post and saw guide being of symmetrical configuration about the plane of motion of a saw carried in said saw guide.

3. A miter box as set forth in claim 2 above in which said bracket extends outwardly of the undersurface of said baseboard, said post member including a base portion, the undersurface of said base portion being recessed such that its outer edge portion is engaged with the upper surface of said bracket.

4. A miter box as set forth in claim 3 above in which means for locking a post member in a given angular position includes a carriage bolt, said bracket and post member including registered holes receiving said bolt, a locking lever disposed on the neck portion of said bolt for rotating the same, said post including a chamber in its base portion communicating with the hole through said post, and a nut located in said chamber and threaded onto said bolt, said chamber being defined by wall portions preventing the rotation of said nut by said bolt whereby rotation of the locking lever selectively releases and locks said post member in a given angular position on said bracket.

5. A miter box as set forth in claim 4 above in which the upper surface of said support bracket includes angular indicia and the base portion of said post includes an index projection for indicating the angular position of said post on said support bracket.

6. A miter box comprising a base, a post member rotatably supported by said base and including opposed uprights extending therefrom, each of said uprights being provided with an upwardly extending guide channel, a sheet metal saw guide including depending plates resiliently flexible to enable said plates to be flexed apart to receive and guide a saw blade therebetween, relatively rigid guide bars secured to opposite outer surface portions of said depending plates and dimensioned to fit within said guide channels, said bars being slidable vertically within the guide channels of said post member, and means extending from said bars for drawing the bars and said depending plates into surface engagement with opposed portions of said post member to provide a predetermined space between said depending plates and to lock said guide in a given vertical position relative to said base.

7. Miter box comprising a base, an upstanding rigid post member rotatably supported by said base and including spaced opposed, vertically disposed guideways, a saw guide including opposed plate portions formed of sheet material sufficiently resiliently flexible to enable said plate portions to be spread apart, said saw guide including guide members slidable vertically in said guideways, and means for spreading apart the plate portions of said saw guide in any given vertical position of said saw guide in said post member to bring the outer surfaces of said guide members into tight surface-to-surface engagement with said post member to provide, between said plate portions, a predetermined space for receiving a saw blade, determined by the space between said guideways, said engagement also serving to lock said saw guide in selected vertical positions.

References Cited in the file of this patent
UNITED STATES PATENTS

| | | |
|---|---|---|
| 713,213 | Green | Nov. 11, 1902 |
| 766,797 | Richard | Aug. 2, 1904 |
| 1,006,201 | Fuhrmann | Oct. 17, 1911 |
| 1,214,561 | McDonald | Feb. 6, 1917 |
| 1,949,261 | Smetak | Feb. 27, 1934 |
| 2,004,475 | Seft | June 11, 1935 |